United States Patent [19]

Prince et al.

[11] Patent Number: 5,059,497
[45] Date of Patent: Oct. 22, 1991

[54] COMPOSITE ION-CONDUCTIVE ELECTROLYTE MEMBER

[75] Inventors: Lawrence S. Prince, Long Beach; Lin R. Higley, Laguna Hills, both of Calif.

[73] Assignee: Hughes Aircraft Company, Los Angeles, Calif.

[21] Appl. No.: 512,222

[22] Filed: Apr. 20, 1990

[51] Int. Cl.$^5$ ............................................. H01M 6/18
[52] U.S. Cl. ................................... 429/193; 429/104; 429/30; 429/33; 252/510; 252/520
[58] Field of Search ...................... 429/193, 104, 30, 33

[56] References Cited

U.S. PATENT DOCUMENTS

| | | | |
|---|---|---|---|
| 4,041,215 | 8/1977 | Kormanyos et al. | 429/104 |
| 4,135,040 | 1/1979 | Thornton | 429/104 |
| 4,244,986 | 1/1981 | Paruso et al. | 429/104 |
| 4,307,138 | 12/1981 | Powers et al. | 429/103 |

Primary Examiner—Brian E. Hearn
Attorney, Agent, or Firm—Robert A. Westerlund; Steven M. Mitchell; Wanda K. Denson-Law

[57] ABSTRACT

A solid, composite, ion-conductive electrolyte member comprised of first and second layers which are bonded together, with the first layer being constituted of an ion-conductive material such as glass or polycrystalline ceramic, e.g., ANL glass or beta-type alumina, and the second layer being preferably constituted of a material selected from the group consisting of the titanium oxide family, most preferably, rutile ($TiO_2$), and its related suboxides ($Ti_NO_{2N-1}$, where N is any selected number from 4–10, inclusive). The first and second layers are preferably intimately bonded together by means of an electrophoretic deposition process, a chemical vapor deposition process, a plasma spraying deposition process, a pyrolitic deposition process, or a pressing and sintering process.

20 Claims, 1 Drawing Sheet

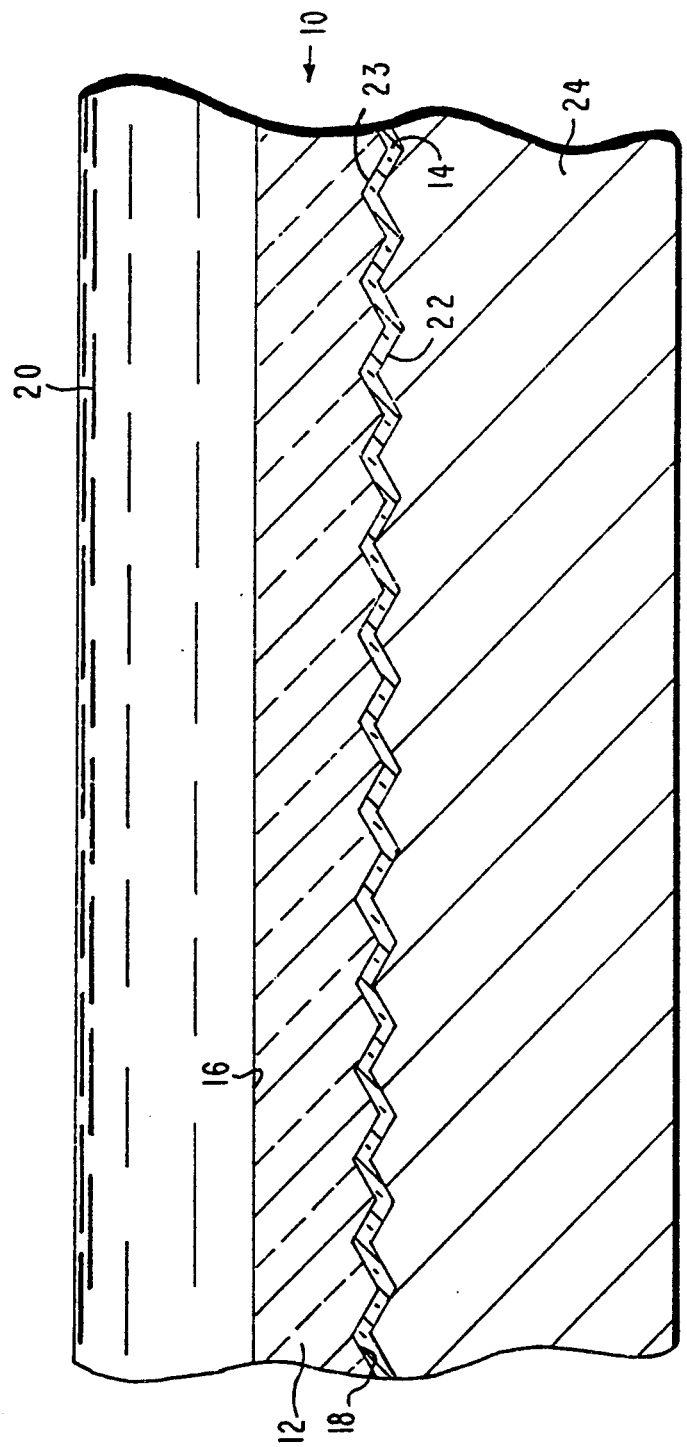

COMPOSITE ION-CONDUCTIVE ELECTROLYTE MEMBER

Field of the Invention

The present invention relates generally to electrolyte members of the type employed in electrochemical cells, and more particularly, to a solid, ion-conductive electrolyte member which has particular utility in cells which operate at high temperatures, e.g., Na/S or Na/MCl$_2$ cells.

Background of the Invention

The utilization of solid ion-conductive electrolyte members in electrochemical cells is well-known. More particularly, the solid electrolyte member typically utilized in high temperature cells, such as Na/S (sodium-sulfur) and Na/MCl$_2$ (sodium-metal chloride) cells, is constituted of beta-type alumina or an ion conducting glass developed by Dow and Argonne National Labs which is generally known as ANL glass. Although electrolyte members constructed of these materials have performed adequately in some applications, in other applications they have exhibited shortcomings which unduly limit the performance, durability, longevity and reliability of the cells in which they are utilized.

More particularly, beta-type alumina and ANL glass exhibit fairly high electrical resistance which, of course, increases as a function of increasing material thickness. Therefore, since the overall performance of the cell is adversely affected by increased internal cell resistance, it is highly desirable to minimize the thickness of the beta-type alumina or ANL glass electrolyte member utilized therein. However, on the other hand, in practical cell applications, the solid electrolyte member must be sufficiently structurally stong to withstand significant, long-term mechanical and thermal loading conditions attributable to both internally-generated loads, e.g., of the type caused by recurring thermal and charge/discharge cycling of the cell, and externally-generated loads, e.g., mechanical shock and vibration and external torquing loads. Of course, the structural strength of the solid electrolyte member increases as a function of its thickness, and thus, it is desirable to increase the thickness of the electrolyte member for the purpose of increasing its structural strength. Therefore, it can be readily appreciated that these competing factors, i.e., minimum electrical resistivity versus maximum structural rigidity, present a trade-off which compromises the specific energy and power density of the cell, on one hand, and the durability, longevity, and reliability of the cell, on the other hand. These shortcomings are aggravated and become especially acute in certain applications, e.g., spacecraft applications, in which the cell is required to perform with virtually no degradation over an elongated service life, e.g., 10 years or more, under rather severe mechanical and thermal loading conditions, e.g., mechanical shock on the order of 30 g., half sine, 8 milliseconds, in each of the principal axes of the spacecraft in which the cell is deployed; and, recurring temperature conditions of 25° C. to 600° C., with temperature gradients of 100° C./minute, over a 10 year service life, including up to 30,000 charge/discharge cycles.

Although solid electrolyte members constructed of a variety of modified versions of the above-mentioned beta-type alumina, or of glasses other than ANL glass, have been proposed, e.g., such as those taught in U.S. Pat. No. 3,966,492, issued to Ludwig, whose teachings are herein incorporated by reference, they have not received widespread acceptance or extensive application, as unmodified beta (or beta") alumina and ANL glass are the materials which are almost exclusively used in the construction of solid electrolytes for Na/S and Na/MCl$_2$ cells which are presently commercially available.

Ultimately then, there presently exists a need for a solid ion-conductive electrolyte member which exhibits less electrical resistance and greater structural strength than currently available solid ion-conductive electrolyte members, without unduly compromising either the electrical or the structural characteristics of the member. The present invention fulfills this need.

SUMMARY OF THE INVENTION

The present invention encompasses a solid, composite, ion-conductive electrolyte member comprised of first and second layers which are bonded together, with the first layer being constituted of an ion-conductive material such as glass and/or polycrystalline ceramic, e.g., ANL glass or beta-type alumina, and the second layer being constituted of a material which is electronically conductive, and highly resistant to the chemical reactants contained within the anode of the electrochemical cell within which the electrolyte member is employed. The material constituting the second layer is preferably sufficiently structurally strong to serve as the primary load bearing component of the electrolyte member. Further, the material constituting the second layer is preferably characterized by a coefficient of thermal expansion (CTE) which is at least within about 25%, and most preferably within about 5%–10% of the CTE of the ion-conductive material constituting the first layer. The second layer material may suitably be any electronically conductive ceramic or metallic material having the above-delineated requisite characteristics, e.g., aluminum silicon carbide, graphite, doped tin oxide, or the like, or any composite, compound, or combination of these materials. Most preferably, the second layer material is selected from the group consisting of the titanium oxide family, preferably, titanium dioxide (TiO$_2$) and its related suboxides (Ti$_N$O$_{2N-1}$, where N is any selected number from 4–10, inclusive). In the presently contemplated best mode of practicing the present invention, the first layer is constituted of beta" alumina and the second layer is constituted of rutile, in order to take full advantage of the nearly perfect match between the coefficients of thermal expansion of these two materials. The first and second layers are preferably intimately bonded together by means of any one of the following processes:

(1) an electrophoretic deposition process;
(2) a chemical vapor deposition process;
(3) a plasma spraying deposition process;
(4) a pyrolitic deposition process;
(5) a glass frit bonding process; or,
(6) a pressing and sintering process.

The composite electrolyte member of the present invention is suited for use in electrochemical cells, particularly high-temperature electrochemical cells such as Na/S and Na/MCl$_2$ cells, e.g., of the tubular or planar type. The first layer of the electrolyte member is disposed in contact with the cathodic reactant, e.g., molten sulfur/sodium polysulfides, of the cell and the second layer is disposed in contact with the anodic reactant of the cell. The first layer is preferably substantially thinner than the second layer. The second layer is preferably sufficiently porous to allow at least a prescribed minimum flow but not greater than a prescribed maximum flow of the anodic reactant therethrough to the first layer, whereby the prescribed minimum flow is selected to facilitate a prescribed discharge rate of the cell, and the prescribed maximum flow is selected to prevent catastrophic damage to the cell in the event of failure of the first layer.

BRIEF DESCRIPTION OF THE DRAWING

The figure is a partially sectional, partially schematic view of a composite electrolyte member embodying features of the present invention.

DETAILED DESCRIPTION OF THE INVENTION

The present invention resides in a solid ion-conductive electrolyte member of novel construction, which is presently contemplated to have particular utility in Na/S cells, although it should be clearly understood that the particular type of cell wherein the electrolyte member is employed is not limiting to the present invention, e.g., it is believed that the present invention will also have particular utility in other types of high-temperature electrochemical cells, e.g., Na/$MCl_2$ cells.

With reference to the figure, there can be seen a solid ionconductive electrolyte member 10 which constitutes a preferred embodiment of the present invention. In the broadest sense of the present invention, the electrolyte member 10 is comprised of a first layer 14 constituted of a material which is selectively ionically conductive with respect to cations of the anodic reactants of the electrochemical cell (not shown) in which the electrolyte member 10 is utilized, and substantially ionically nonconductive or impermeable with respect to other ions which may be stored in the cathodic reactants of the cell; and a bonded second layer 12 constituted of an electronically conductive material which is highly resistant to the anodic reactants of the cell, and which preferably possesses sufficient structural strength to enable it to serve as the primary load-bearing component of the electrolyte member 10. The material constituting the second layer 12 is also preferably characterized by a coefficient of thermal expansion (CTE) which is at least within about 25%, and most preferably, within about 5%–10% (0% being ideal) of the CTE of the ion-conductive material constituting the first layer 14. In this connection, the material constituting the second layer 12 may suitably be any electronically conductive ceramic or metallic material having the abovedelineated requisite and preferred characteristics, e.g., aluminum silicon carbide, doped tin oxide, graphite, etc., or composites, compounds, mixtures, and/or combinations of these materials. Preferably, the material constituting the second layer 12 is selected from the group consisting of the titanium oxide family, e.g., the Ti O materials taught in U.S. Pat. No. 4,422,917, issued to Hayfield, whose teachings are herein incorporated by reference. The terminology "titanium oxide family" is intended to also encompass suitably doped Ti O materials, e.g., such as tantalum or niobium-doped Ti O materials, e.g., such as are taught in U.S. Pat. No. 3,985,575 issued to Ludwig, whose teachings are also herein incorporated by reference. Most preferably, the second layer 12 is constituted of titanium dioxide (Ti $O_2$) or its related suboxides (Ti$_N$ $O_{2N-1}$, where N can be any integer from 4–10, inclusive).

It should be clearly understood that the particular material selected for the first layer 14 is not limiting to the broader inventive concepts disclosed herein. Illustratively, any of the glasses (e.g., ANL glass) and/or polycrystalline materials (e.g., beta-type alumina) disclosed in U.S. Pat. No. 4,135,040, issued to Thornton, and previously referenced U.S. Pat. No. 3,966,492, may conveniently be utilized.

In order to achieve firmly adherent, intimate bonding between the first layer 14 and the second layer 12, which is especially necessary in the context of a high-temperature (e.g., 350° C.) electrochemical cell, such as a Na/S cell, the material constituting the second layer 12 is preferably sufficiently porous (e.g., 20%–60% porosity) to permit the ion-conductive material constituting the first layer 14 to penetrate thereinto by implementation of a suitable coating process. Suitable coating processes include chemical vapor deposition (CVD), electrophoretic deposition (EPD), plasma spraying, pyrolitic deposition, glass frit bonding, and an in situ pressing and sintering process. Generally, if the ion-conductive material selected for manufacture of the first layer 14 is a ceramic (vis-a-vis glass) material, such as beta-type alumina, this material is preferably deposited onto the second layer 12, which would thus serve as a preformed substrate, by means of a CVD, EDP, or plasma spraying process. Alternatively, the material constituting the second layer 12 may be deposited by one of these processes onto the first layer 14, which would thus serve as a preformed substrate, generally with the support of a backing layer (not shown) which would be separated therefrom after the deposition process is completed. If ANL glass is utilized as the ion-conductive material for the first layer 14, then it is preferably deposited onto the major surface 18 of the second layer 12 by means of a pyrolitic deposition process, e.g., the ANL glass could be coated over the major surface 18 of the second layer 12 and fired in place. In either embodiment of the first layer 14 (i.e., glass or ceramic), the first layer 14 and second layer 12 may be securely bonded or joined together by means of a glass frit bonding process, whereby a polka-dot grid or matrix of pyrolitic glass frit cleats or beads (not shown) are deposited onto one or both of the interfacing surfaces of the first layer 14 and the second layer 12, and the first layer 14 and the second layer 12 are pressed together. Of course, when the glass hardens, the bond is achieved. Preferably, the glass beads are spaced apart from each other by an amount sufficient to ensure less than approximately 50% surface coverage, but this is not limiting to the present invention. Of course, since the glass frit is in direct contact with both the first layer 14 and the second layer 12, it should be comprised of a glass composition which has a CTE within at least approximately 25% of the CTE of the materials constituting these layers. Suitable glasses are disclosed in U.S. Pat. Nos. 4,347,295; 4,291,107; and, 4,341,849, all of which teachings are herein incorporated by reference. It can also be envisioned that the electrolyte member 10 can be fabricated by pressing powdered compositions of the materials constituting the first and second layers 14,12, and then sintering in situ to form a composite.

In the presently contemplated best mode of the instant invention, the first layer 14 is constituted of beta" alumina, and the second layer 12 is constituted of titanium oxide, in order to achieve a nearly perfect CTE match between these two bonded-together layers, thereby minimizing the possibility of delamination of the electrolyte member 10 even under extreme thermal conditions over long periods of time. The majority of the remainder of this discussion is based upon this best mode of the present invention, although most of the remarks encompassed by this discussion are equally applicable to all other preferred and alternative embodiments of the instant invention.

As can be seen in the Figure, the second layer 12 constituted of titanium dioxide has a major surface 16 which, in the utilization of the electrolyte member 10 in an electrochemical cell (not shown), e.g., a Na/S cell, is disposed in contact with the anode 20, e.g., molten sodium, of the cell. Further, as can also be seen in the Figure, the ion-conductive first layer 14 constituted of beta" alumina has an outboard major surface 22 which, in the utilization of the electrolyte member 10 in an electrochemical cell (not shown), e.g., a Na/S cell, is disposed in contact with the cathode 24, e.g., molten sulfur/sodium polysulfides, of the cell. In this connection, the principles of construction and operation of electrochemical cells, e.g., Na/S cells, and the function of solid ion-conductive electrolytes incorporated therein, are well-known in the art, and are therefore not disclosed herein. For a comprehensive understanding of the construction and operation of Na/S cells, for example, reference may be made to the publications entitled "Sodium-Sulfur Batteries," by Marcoux and Soo, Advan. Chem. Ser. No. 140,216 (1975); "The Sodium-Sulfur Battery," by J. L. Sudworth and A. R. Tilley, published by Chapman and Hall, New York (1985); and, "Rechargeable Batteries, Advances Since 1977," by Robert W. Graham, published by Noyes Data Corporation (1980), Library of Congress Catalog Card Number: 80-13152 (ISBN: 0-8155-0802-6).

The above-described composite electrolyte member 10 of the instant invention affords significant advantages over presently available electrolyte members. More particularly, since titanium dioxide can be made to have greater structural integrity than beta" alumina, because its thickness is relatively unlimited by electrical resistivity considerations, the electrolyte member 10 of the present invention can be made to be structurally load-bearing without comprising the internal cell resistance. Further, since rutile is significantly less electrically resistant than beta" alumina, then the overall electrical resistivity of the electrolyte member 10 of the present invention can be made to be substantially less than that of presently available electrolyte members. Therefore, since the electrical resistance of the solid electrolyte of electrochemical cells such as Na/S cells constitutes a substantial portion (e.g., 60%) of the overall internal cell resistance, the solid electrolyte 10 of the present invention could have a profound positive impact on the overall performance of such cells, e.g., a 20-25% increase in power density and peak power capability of such cells. Moreover, the much greater overall structural strength afforded by the solid electrolyte 10 of the present invention greatly reduces the probability of cell failure or unacceptable performance degradation due to mechanical failure of the electrolyte, which constitutes the primary cause of failure of presently available electrochemical cells such as Na/S cells or the like. Yet further, the superior structural integrity of a cell incorporating the electrolyte member 10 of the present invention enables the cell to be utilized in many applications, e.g., spacecraft applications, which are not feasible for presently available cells, due to lack of reliability, durability, and longevity of the electrolyte members employed therein.

In the presently contemplated practice of the present invention, the ion-conductive first layer 14 is preferably relatively thinner than the second layer 12, since, as previously mentioned, the electrical resistance of the electrolyte member 10, which to a substantial extent governs the overall internal cell resistance and thus, performance of the cell in which it is employed, undesirably increases as a function of the thickness of the ceramic or glass ion-conductive material, e.g., beta-type alumina or ANL glass, which constitutes the first layer 14 of the electrolyte member 10. Most preferably, the first layer 14 is much thinner than the second layer 12, since optimum cell performance (i.e., minimum internal cell resistance) is achieved by making the first layer 14 as thin as possible. This objective is made possible by the present invention, since the second layer 12 serves as the primary load-bearing component of the electrolyte member 10 of the instant invention. However, it should be recognized that the specific dimensions, shape, size, and/or configuration of the solid electrolyte member 10 and its constituent elements (i.e., the first layer 14 and the second layer 12) are not limiting to the present invention. Rather, as will be readily appreciated by those skilled in the pertinent art, these physical parameters will vary depending upon the performance requirements and specific application of the cell in which the electrolyte member 10 is employed, as well as upon the structural configuration and type of the cell itself. For example, the overall configuration of the electrolyte member 10 would be generally planar if the electrolyte member 10 is utilized in flat-plate or planar cells, e.g., planar Na/S cells, such as those disclosed in U.S. Pat. Nos. 3,783,024, issued to Gibson et al., and 4,226,923, issued to Mikkor, and, in co-pending U.S. patent application Ser. No. 07/506 748, entitled "Planar Sodium-Sulfur Electrical Storage Cell," filed on Apr. 20, 1990 in the names of Sernka and Taenaka, all of whose teachings are herein incorporated by reference. By the same token, the configuration of the electrolyte member 10 would be either generally annular or tubular if the electrolyte member 10 is utilized in the more conventional generally cylindrical cells, such as Na/S cells of the type taught in U.S. Pat. No. 4,460,662, issued to Damrow et al. or in any of the numerous patents listed in Table 1 thereof, all of which patents are herein incorporated by reference.

Additionally, since rutile is an easily machinable and formable material, the major surface 18 (and, if desired, the major surface 16) of the second layer 12 which is bonded to the layer 14, may conveniently be textured or contoured, to thereby increase the effective surface area of the electrolyte member 10 which contacts the cathode 24, since the contour of the first layer 14 conforms to that of the major surface 18 of the substrate 12. In this way, as is known in the art, the overall cell performance is improved. For example, as is shown in the Figure, the major surface 18 of the second layer 12 and the major surfaces 22, 23 of the first layer 14 bonded thereto, can suitably be ridged or corrugated. However, it will be appreciated by those skilled in the pertinent art that many types of textures or contours other than the specific type shown in the Figure may alternatively be utilized, e.g., any of the types shown and described in U.S. Pat. No. 4,135,040, issued to Thornton, whose teachings are herein incorporated by reference.

Although not limiting to the broader inventive concepts disclosed herein, it is preferred that, when the electrolyte member 10 is employed in a Na/S cell (not shown), the second layer 12 have a porosity (e.g., 20%-60% porosity with pore sizes of about 5-20 microns) which allows sufficient flow of the molten sodium comprising the anode 20, therethrough, to the ionconductive first layer 14, to facilitate a prescribed/desired discharge rate of the Na/S cell while simultaneously preventing excess flow of the molten sodium in the event of mechanical failure of the ion-conductive first layer 14 (e.g., cracking, rupturing, or fracturing of the layer 14), to to thereby prevent catastrophic damage (e.g., rupturing or bursting) of the Na/S cell of such a nature as to render the cell unsafe, e.g., as a result of leakage of molten sodium or molten sulfur/sodium polysulfides from the cell, due to the occurrence of uncontrolled electrochemical reactions within the cell upon failure of the first layer 14 of the electrolyte member 10. Thus, it will be appreciated that this particular construction of the solid electrolyte member 10 of the present invention constitutes a primary safety mechanism for the cell in which it is incorporated. It should be recognized that the specific pore sizes and porosity percentages which are optimum will vary depending upon the particular material employed for the second layer 12, and are therefore, not limiting to the broader aspects of the present invention.

Those skilled in the electrochemical battery art are easily capable of determining the specific dimensions, porosities, and materials which are appropriate for any given cell configuration and application, in light of the information provided herein. In this vein, although a presently preferred embodiment of the present invention has been described in detail, it should be clearly understood that many variations and/or modifications of the basic inventive concepts herein taught which may appear to those skilled in the pertinent art will fall within the spirit and scope of the present invention, which should be interpreted on the basis of the following claims.

What is claimed is:

1. An electrochemical cell including:
   an anode containing anodic reactants;
   a cathode containing cathodic reactants;
   a composite ion-conductive electrolyte member, including:
     a first layer constituted of an ion-conductive material;
     a second layer bonded to said first layer, said second layer being constituted of an electrically conductive material which is highly resistant to the anodic reactants of the cell, and which is sufficiently porous to allow flow of anodic reactants to contact said first layer; and,
   wherein said first layer is disposed in contact with the cathode of the cell, and said second layer is disposed in contact with the anode of the cell.

2. The electrochemical cell as set forth in claim 1, wherein said material constituting said second layer possesses sufficient structural strength to enable it serve as the primary load-bearing component of the electrolyte member.

3. The electrochemical cell as set forth in claim 2, wherein said material constituting said second layer is characterized by a coefficient of thermal expansion which is at least within approximately 25% of the coefficient of thermal expansion of said ion-conductive material constituting said first layer.

4. The electrochemical cell as set forth in claim 2, wherein said material constituting said second layer is characterized by a coefficient of thermal expansion which is at least within about 10% of the coefficient of thermal expansion of said ion-conductive material constituting said first layer.

5. The electrochemical cell as set forth in claim 3, wherein said material constituting said second layer is ceramic.

6. The electrochemical cell as set forth in claim 1, wherein said ion-conductive material constituting said first layer is selected from the group consisting of beta-type alumina and ANL glass.

7. The electrochemical cell as set forth in claim 1, wherein said second layer is intimately bonded to said first layer by means of an electrophoretic deposition process.

8. The electrochemical cell as set forth in claim 1, wherein said ion-conductive material constituting said first layer is selected from the group consisting of glass and polycrystalline ceramic.

9. The electrochemical cell as set forth in claim 1, wherein said second layer is intimately bonded to said first layer by means of a chemical vapor deposition process.

10. The electrochemical cell as set forth in claim 1, wherein said second layer is securely bonded to said first layer by means of an adhesive glass frit bonding process.

11. The electrochemical cell as set forth in claim 1, wherein said material constituting said second layer is selected from the group consisting of the titanium oxide family.

12. The electrochemical cell as set forth in claim 1, wherein said material constituting said second layer is selected from the group consisting of $Ti\,O_2$ and $Ti_N\,O_{2N-1}$, wherein N is any selected number from 4-10, inclusive.

13. The electrochemical cell as set forth in claim 3, wherein said material constituting said second layer is selected from the group consisting of ceramics, metals, and combinations, compounds, mixtures, and composites thereof.

14. The electrochemical cell as set forth in claim 1, wherein said material constituting said second layer comprises titanium dioxide, and said material constituting said first layer comprises beta-type alumina.

15. The electrochemical cell as set forth in claim 1, wherein said second layer is intimately bonded to said first layer by means of a plasma spraying process.

16. The electrochemical cell as set forth in claim 1, wherein said second layer is intimately bonded to said first layer by means of a pyrolitic deposition process.

17. The electrochemical cell as set forth in claim 2, wherein said first layer is substantially thinner than said second layer.

18. The electrochemical cell as set forth in claim 2, wherein at least the major surface of said first layer which is disposed in contact with said cathode is textured.

19. The electrochemical cell as set forth in claim 1, wherein the interfacing major surfaces of said first and second layers, and the major surface of said first layer which is disposed in contact with said cathode, are textured.

20. The electrochemical cell as set forth in claim 1, wherein said anodic reactants are molten, and wherein further, said second layer is sufficiently porous to allow at least a prescribed minimum flow but no greater than a prescribed maximum flow of said anodic reactant therethrough to said first layer, whereby said prescribed minimum flow is selected to facilitate a prescribed discharge rate of said electrochemical cell, and said prescribed maximum flow is selected to prevent catastrophic damage to said cell in the event of failure of said first layer.

* * * * *